(12) United States Patent
Palmqvist et al.

(10) Patent No.: US 10,194,633 B2
(45) Date of Patent: Feb. 5, 2019

(54) CONTROL ARRANGEMENT AND METHOD FOR GUIDING ANIMALS

(71) Applicant: DELAVAL HOLDING AB, Tumba (SE)

(72) Inventors: Martin Palmqvist, Tumba (SE); Ron Mulder, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 346 days.

(21) Appl. No.: 15/118,948

(22) PCT Filed: Feb. 13, 2015

(86) PCT No.: PCT/SE2015/050175
§ 371 (c)(1),
(2) Date: Aug. 15, 2016

(87) PCT Pub. No.: WO2015/122837
PCT Pub. Date: Aug. 20, 2015

(65) Prior Publication Data
US 2017/0049069 A1    Feb. 23, 2017

(30) Foreign Application Priority Data
Feb. 14, 2014 (SE) .................................. 1450176

(51) Int. Cl.
*A01K 1/00* (2006.01)
*A01K 1/12* (2006.01)
*A01K 11/00* (2006.01)

(52) U.S. Cl.
CPC ............ *A01K 1/0023* (2013.01); *A01K 1/12* (2013.01); *A01K 11/006* (2013.01)

(58) Field of Classification Search
CPC ....... A01K 1/0023; A01K 1/0029; A01K 1/12
See application file for complete search history.

(56) References Cited

U.S. PATENT DOCUMENTS 5,782,199 A    7/1998  Oosterling
6,062,164 A *  5/2000  Oosterling ............ A01J 5/0175
                                                                    119/14.02
(Continued)

FOREIGN PATENT DOCUMENTS

CA    2862145 A1 *  7/2013  ............... A01K 1/12
EA     009146 B1     10/2007
(Continued)

OTHER PUBLICATIONS

International-Type Search Report, dated Sep. 17, 2014, from corresponding PCT application.
(Continued)

*Primary Examiner* — Kristen C Hayes
(74) *Attorney, Agent, or Firm* — Young & Thompson

(57) ABSTRACT

A control arrangement for controlling movement of animals, with at least two smart gate arrangements and a same number of enclosed transit areas, wherein smart gate arrangement includes an entrance through which animals can enter, an animal identifier identifies each animal entering the smart gate arrangement, and three separate exits, through which each animal can be selectively guided to exit the smart gate arrangement after having been identified, and wherein each transit area is provided with a first one of the exits of a first one of the smart gate arrangements and an entrance of a neighboring second one of the smart gate arrangements with an unobstructed pathway therebetween contained within the transit area, the plurality of enclosed transit areas being interconnected via the smart gate arrangements such that an animal can be guided through the at least two smart gate arrangements via the transit areas in a circulating manner.

21 Claims, 5 Drawing Sheets

(56) References Cited

U.S. PATENT DOCUMENTS

| | | | |
|---|---|---|---|
| 6,213,058 B1 | 4/2001 | Byl | |
| 7,210,428 B2 * | 5/2007 | Thibault | A01K 1/0023 |
| | | | 119/712 |
| 8,443,762 B2 * | 5/2013 | Wastell | A01K 1/0209 |
| | | | 119/436 |
| 2003/0226522 A1 * | 12/2003 | Thibault | A01K 1/0023 |
| | | | 119/842 |
| 2008/0017118 A1 | 1/2008 | Wigholm et al. | |
| 2011/0180018 A1 * | 7/2011 | Wastell | A01K 1/0023 |
| | | | 119/843 |
| 2013/0112143 A1 * | 5/2013 | Mulder | A01J 5/007 |
| | | | 119/14.02 |

FOREIGN PATENT DOCUMENTS

| | | |
|---|---|---|
| RU | 35951 U1 | 2/2004 |
| RU | 87 870 U1 | 10/2009 |
| RU | 2010 127 858 A | 1/2012 |
| WO | 00/01226 A1 | 1/2000 |
| WO | 2006/133717 A2 | 12/2006 |
| WO | 2007/078234 A1 | 7/2007 |
| WO | 2008/008031 A1 | 1/2008 |
| WO | 2012/005672 A1 | 1/2012 |

OTHER PUBLICATIONS

International Search Report, dated Jun. 19, 2015, from corresponding PCT application.
Supplementary International Search Report, dated Mar. 4, 2016, from corresponding PCT application.

* cited by examiner

CONTROL ARRANGEMENT AND METHOD FOR GUIDING ANIMALS

TECHNICAL FIELD

The technical field is generally directed to controlling movement of animals.

RELATED ART

A problem with advanced arrangements for guiding animals, such as cows, in a farm such as a pasture or grassland based farm is that there may be many animal crossings, which may cause jams.

Animals may block intersections and they may not always like to move in such conventional traffic patterns. They may become stressed and noisy, which leads to inefficient movement of animals and to deteriorated animal wellbeing.

SUMMARY

It is an aim of this document to reveal novel arrangements for guiding animals, and for controlling the movement thereof, which alleviate or at least mitigate problems of prior art.

A first aspect refers a control arrangement for controlling movement of animals comprising at least two smart gate arrangements and the same number of enclosed transit areas. Each smart gate arrangement includes an entrance through which animals can enter the smart gate arrangement, an animal identifier for identifying each animal having entered or is to enter the smart gate arrangement, and three separate exits, through which each animal, which has entered the smart gate arrangement, can be selectively guided to exit the smart gate arrangement after having been identified. Each transit area interconnects a first one of the exits of one of the smart gate arrangements with the entrance of a neighboring one of the smart gate arrangements in such a manner that an animal can be guided through the at least two smart gate arrangements via the transit areas in a circulating manner.

The transit areas comprises at least two one-way gates for entrance to the transit area, and the control arrangement is connectable to a number of enclosed operating areas corresponding to twice the number of the transit areas, such that animals in each of the operating areas can enter the control arrangement through a respective one of the one-way gates and are capable of being guided through the control arrangement to exit from the control arrangement and enter each of the operating areas through a respective one of the second and third exits of the smart gate arrangements.

The first one of the exits of each of the smart gate arrangements is the innermost exit of the smart gate arrangement with respect to the circulation, whereas the second and third exits of each of the smart gate arrangements are directed outwardly with respect to the circulation. Preferably, the smart gate arrangements and the transit areas are designed such that animals circulate in a circular, elliptic, or oval shaped path. Hereby, a roundabout based arrangement for animals is achieved. To achieve a smooth circulation, the entrance and first one/innermost of the exits of each of the smart gate arrangements are arranged essentially parallel with the tangential direction of the circular, elliptic, or oval shaped roundabout based arrangement at each location along the circumference thereof.

Preferably, the animals are entering the transit areas on a voluntary basis and move around in the roundabout based arrangement on a voluntary basis. The smart gate arrangements are controlled depending on the identities of the animals such that each animal can be automatically guided out of the roundabout based arrangement at a selected exit to enter a selected operating area.

To this end, the smart gate arrangements are each a computer controlled arrangement, wherein each animal can be automatically guided to exit the smart gate through a selected one of the three separate exits depending on the identity of the animal.

The control arrangement is preferably connectable to the operating areas, such that animals from half of the operating areas, which enter a transit area, can be guided back to the operating area, from which it came, by means of being guided through only one of the smart gate arrangements. These half of the operating areas may be feeding areas or pastures, wherein animals can be led back to the feeding area or pasture, from where they came, if too early to move them to another operating area, such as another feeding area or pasture, or a milking area. In the latter case, it is quite normal that animals enter the roundabout based arrangement while they do not have milking permission yet. In such instance, the animals may typically be led back to the feeding area or pasture, from where it came.

The benefit of such arrangement is that animals in these operating areas, which are not going to be guided to another operating area at a particular instance, only occupy a single one of the smart gate arrangements, and will thus to a lesser degree slow down the traffic in the roundabout based arrangement.

Animals in the other half of the operating areas, which should be guided back to the operating area, from where it came, have to circulate through all smart gate arrangements of the roundabout based arrangement, i.e. make an entire revolution therein.

The transit areas may each be large enough to house a plurality, e.g. two, three, four, or more of the animals at a time and may be funnel shaped at least in a portion closest to the entrance of the smart gate arrangement, which is connected thereto. That is, the entrance to each smart gate arrangement is arranged in the bottom end of the funnel.

A benefit of that the transit areas may each be large enough to house many animals is that slow animals can be passed by faster animals, thereby avoiding traffic jams. Drinking water could be available in the transit areas, but a too slow circulation could be caused by animals being enticed to stay in the transit areas too long times. Therefore, the transit areas should be designed properly.

A benefit of that the transit areas may each be funnel shaped at least in a portion closest to the entrance of the smart gate arrangement, is that the shape will assist in guiding the animals in the transit areas to move in a path towards next smart gate arrangement.

In one embodiment, the number of the smart gate arrangements is two, the number of the transit areas is two, and the number of the one-way gates is four. The operating areas may be three feeding areas, particularly pasture areas, wherein animals are fed, and one milking area, wherein animals are milked. Each one of two of the three feeding areas can be selected, such that animals in the feeding area, which enter a transit area, can be guided back to the feeding area, from which it came, by means of being guided through only one of the smart gate arrangements. This means that animals only in one feeding area or pasture has to pass both smart gate arrangements when being guided back to that feeding area or pasture.

In one embodiment, the number of the smart gate arrangements is three, the number of the transit areas is three, and the number of the one-way gates is six. Here, the operating areas may be at least three feeding areas, particularly pasture areas, wherein animals are fed, at least one milking area, wherein animals are milked, and optionally at least one treatment area, wherein animals are treated.

Each one of three of the at least three feeding areas may be selected, such that animals in the feeding area, which enter a transit area, can be guided back to the feeding area, from which it came, by means of being guided through only one of the smart gate arrangements.

In one embodiment, the number of the smart gate arrangements is four, the number of the transit areas is four, and the number of the one way gates is eight. Here six operating areas may be feeding areas or pastures.

A second aspect refers to an animal farm comprising the control arrangement of the first aspect and operation areas connected to the control arrangement. The operating areas may be as disclosed above, wherein at least three are feeding areas, particularly pasture areas, wherein animals are fed, and at least one is a milking area, wherein animals are milked.

A third aspect refers to a method for guiding an animal from a first one to a second one of a plurality of enclosed operating areas by means of the control arrangement of the first aspect. The animal is allowed to enter the control arrangement on a voluntary basis. In one smart gate arrangement, or, if required, in each of a plurality of the smart gate arrangements, which are connected to one another via a respective transit area, (i) the animal is identified, (ii) the second operating area is identified based on the identity of the animal, and (iii) the animal is selectively guided to exit the smart gate arrangement through the second exit thereof, if the second exit is connected to the second operating area, through the third exit thereof, if the third exit is connected to the second operating area, and through the first exit thereof, if neither of the second and third exits is connected to the second operating area.

In such manner, the animal is guided through the control arrangement or, and can be guided to the selected operating area without having to pass any animal crossing and without having to make any sharp turns.

A fourth aspect refers to control arrangement comprising (i) a first smart gate arrangements including an entrance through which animals can enter the smart gate arrangement, an animal identifier for identifying each animal having entered or is to enter the smart gate arrangement, and three separate exits, through which each animal, which has entered the smart gate arrangement, can be selectively guided to exit the smart gate arrangement after having been identified; (ii) a second smart gate arrangements including an entrance through which animals can enter the smart gate arrangement, an animal identifier for identifying each animal having entered or is to enter the smart gate arrangement, and two separate exits, through which each animal, which has entered the smart gate arrangement, can be selectively guided to exit the smart gate arrangement after having been identified; and (iii) at least a third smart gate arrangements including an entrance through which animals can enter the smart gate arrangement, an animal identifier for identifying each animal having entered or is to enter the smart gate arrangement, and two or three separate exits, through which each animal, which has entered the smart gate arrangement, can be selectively guided to exit the smart gate arrangement after having been identified.

A number of enclosed transit areas are provided, which corresponds to the number of the smart gate arrangements, wherein each transit area interconnects a first one of the exits of one of the smart gate arrangements with the entrance of a neighboring one of the smart gate arrangements in such a manner that an animal can be guided through the smart gate arrangements via the transit areas in a circulating manner.

The control arrangement is connectable to a number of enclosed operating areas corresponding to the twice the number of the transit areas minus the number of smart gate arrangements having only two exits, and the transit areas comprise one-way gates for entrance from each of the operating areas to the transit area, such that animals in each of the operating areas can enter the control arrangement through a respective one of the one-way gates and are capable of being guided through the control arrangement to exit from the control arrangement and enter each of the operating areas through a respective one of the second and optional third exits of the smart gate arrangements.

By the above aspects and embodiments, an improved animal traffic can be obtained, which is more efficient, while the well being of the animals is increased. This provides in turn for an improved overall efficiency of the animal farming.

Further characteristics and advantages will be evident from the detailed description of embodiments given hereinafter, and the accompanying FIGS. 1-5, which are given by way of illustration only.

DETAILED DESCRIPTION OF EMBODIMENTS

Figure 1:
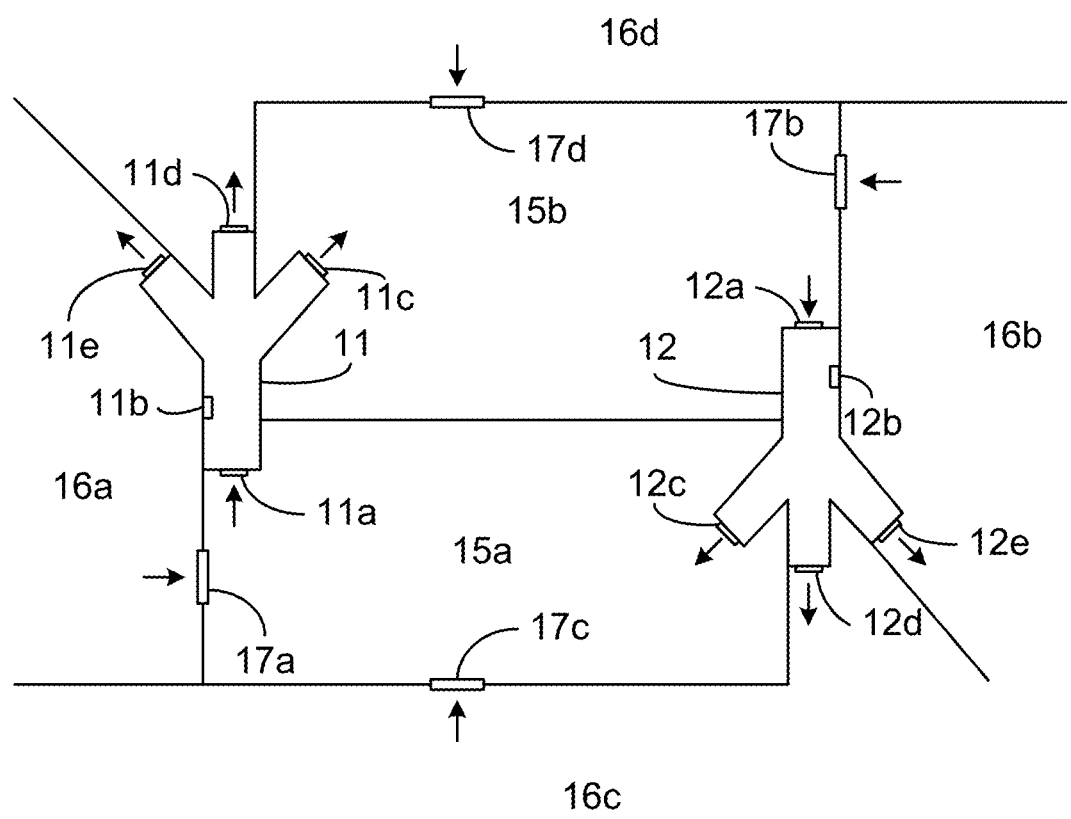
FIGS. 1-5 illustrate each, schematically, in top view, a control arrangement for controlling movement of animals according to a respective embodiment.

FIG. 1 illustrates a control arrangement for controlling movement of animals such as cows comprising two smart gate arrangements 11, 12, each smart gate arrangement 11, 12 including an entrance 11a, 12a through which animals can enter the smart gate arrangement 11, 12, an animal identifier 11b, 12b for identifying each animal having entered or is to enter the smart gate arrangement 11, 12, and three separate exits 11c-e, 12c-e, through which each animal, which has entered the smart gate arrangement 11, 12, can be selectively guided to exit the smart gate arrangement 11, 12 after having been identified.

Further, the control arrangement comprises two enclosed transit areas 15a-b, wherein each transit area 15b, 15a interconnects a first one 11c, 12c of the exits of one of the smart gate arrangements 11, 12 with the entrance 12a, 11a of a neighboring one of the smart gate arrangements 12, 11 in such a manner that an animal can be guided through the two smart gate arrangements 11, 12 via the transit areas 15a-b in a circulating manner. Each of the two transit areas 15a-b comprises two one-way gates 17a-d for entrance to the transit area.

Finally, the control arrangement is connected to four enclosed operating areas 16a-d, such that animals in each of the operating areas 16a-d can enter the control arrangement through a respective one of the four one-way gates 17a-d on a voluntary basis and are capable of being guided automatically through the control arrangement to exit from the control arrangement and enter each of the operating areas 16a-d through a respective one of the second and third exits 11d-e, 12d-e of the smart gate arrangements 11, 12.

It can be seen from FIG. 1 that animals from half of the operating areas 16a, 16b, which enter a transit area 15a, 15b, can be guided back to the operating area 16a, 16b, from which it came, by means of being guided through only one of the smart gate arrangements 11, 12.

Preferably, each of the transit areas 15a-b is large enough to house a plurality of the animals at a time. The transit areas 15a-b may each house at least two, at least three, at least five, or at least ten animals at a time. Typically, each three square meters may house animal such as a cow. A suitable size may be between 15 and 40 square meters.

The operating areas 16a-d may be three feeding areas 16a-c, particularly pasture areas, wherein animals are fed, and one milking area 16d, wherein animals are milked.

Figure 2:
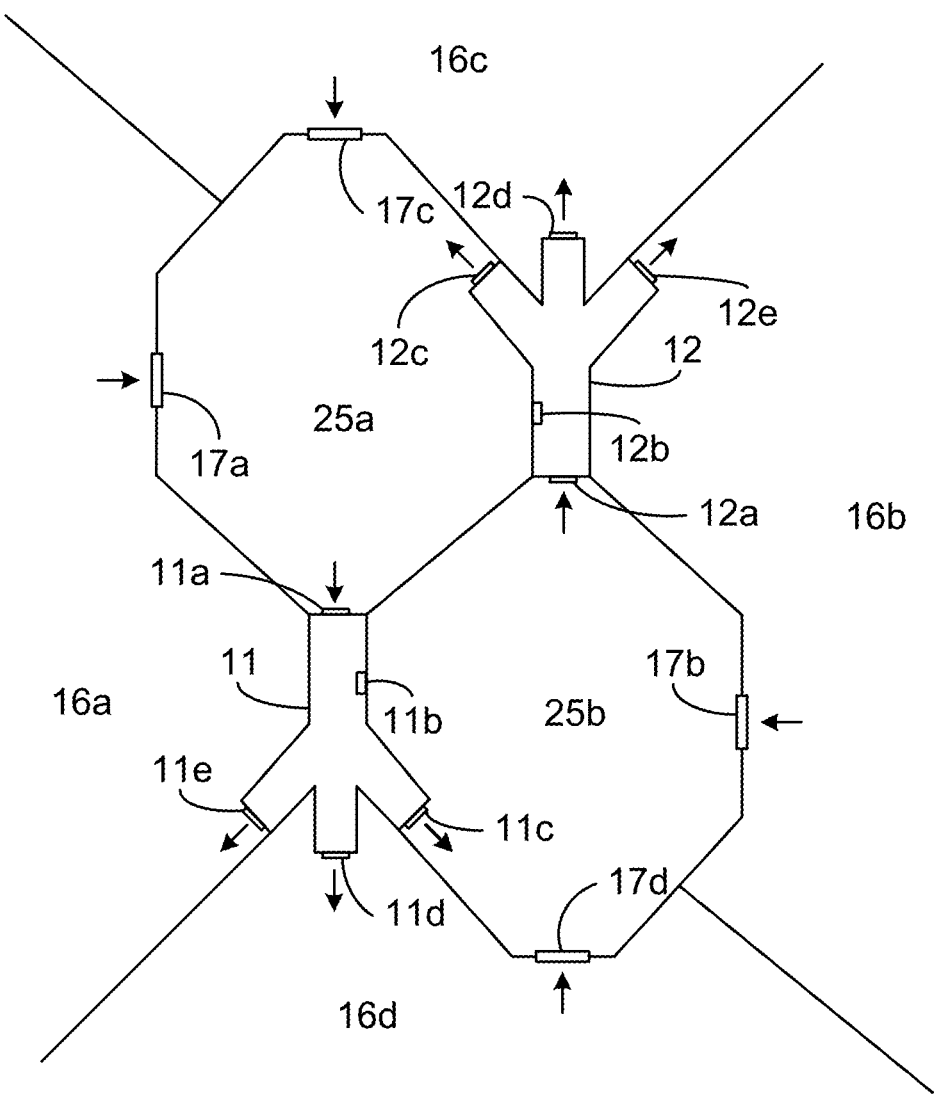

FIG. 2 illustrates a control arrangement similar to the control arrangement of FIG. 1 but with transit areas 25a-b having funnel shaped entrance portions to the smart gate arrangements 11, 12.

A control arrangement as the one in FIG. 1 or 2 may house up to about 400 or even 500 cows.

Figure 3:
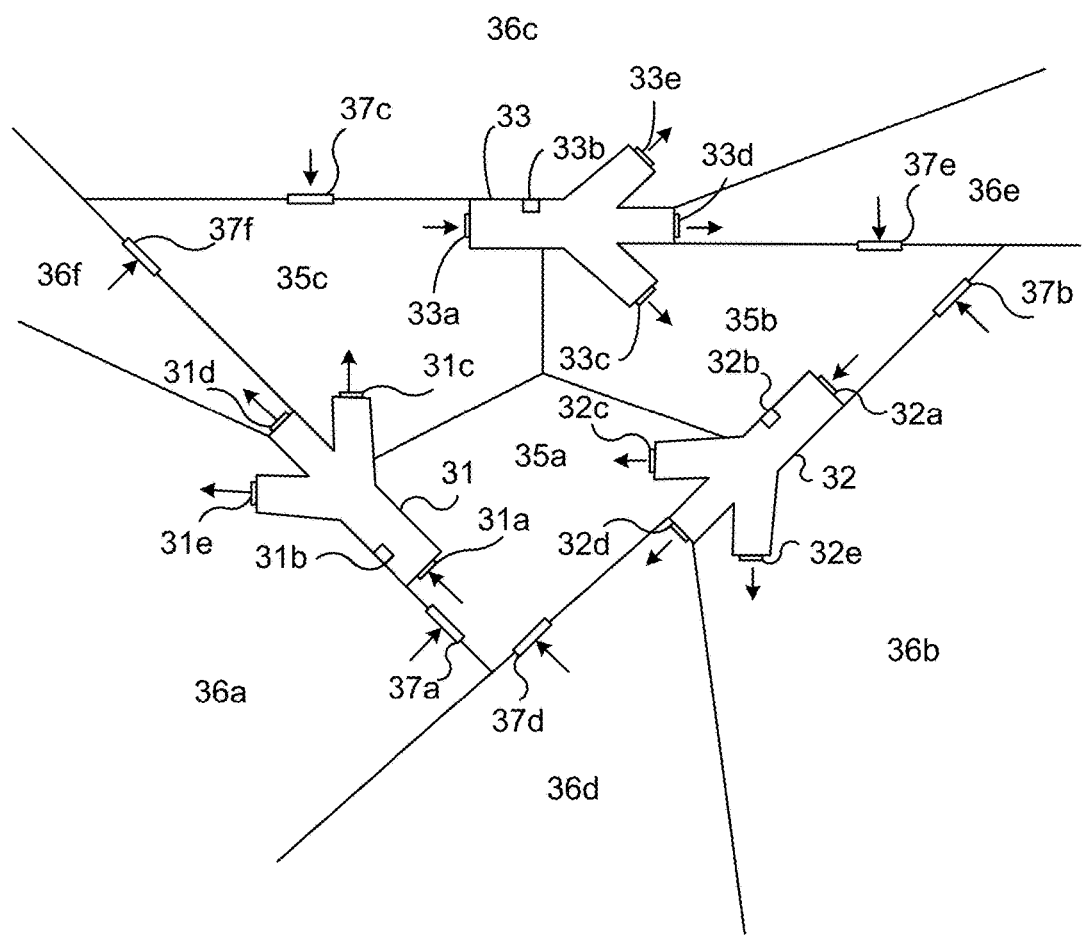

FIG. 3 illustrates a control arrangement for controlling movement of animals comprising three smart gate arrangements 31, 32, 33, each smart gate arrangement 31, 32, 33 including an entrance 31a, 32a, 33a through which animals can enter the smart gate arrangement 31, 32, 33, an animal identifier 31b, 32b, 33b for identifying each animal having entered or is to enter the smart gate arrangement 31, 32, 33, and three separate exits 31c-e, 32c-e, 33c-e, through which each animal, which has entered the smart gate arrangement 31, 32, 33 can be selectively guided to exit the smart gate arrangement 31, 32, 33 after having been identified.

Further, the control arrangement comprises three enclosed transit areas 35a-c, wherein each transit area 35c, 35b, 35a interconnects a first one 31c, 33c, 32c of the exits of one of the smart gate arrangements 31, 33, 32 with the entrance 33a, 32a, 31a of a neighboring one of the smart gate arrangements 33, 32, 31 in such a manner that an animal can be guided through the three smart gate arrangements 31, 32, 33 via the three transit areas 35a-c in a circulating manner. Each of the transit areas 35a-c comprises two one-way gates 37a-f for entrance to the transit area.

Finally, the control arrangement is connected to six enclosed operating areas 36a-f, such that animals in each of the operating areas 36a-f can enter the control arrangement through a respective one of the six one-way gates 37a-f on a voluntary basis and are capable of being guided automatically and selectively through the control arrangement to exit from the control arrangement and enter each of the six operating areas 36a-f through a respective one of the second and third exits 31d-e, 32d-e, 33d-e of the smart gate arrangements 31, 32, 33.

It can be seen from FIG. 3 that animals from half of the operating areas 36a, 36b, 36c, which enter a transit area 35a, 35b, 35c can be guided back to the operating area 36a, 36b, 36c, from which it came, by means of being guided through only one of the smart gate arrangements 31, 32, 33.

Preferably, each of the transit areas 35a-c is large enough to house a plurality of the animals at a time.

The operating areas 36a-f may be three feeding areas 36a-c, particularly pasture areas, wherein animals are fed, and one milking area 36d, wherein animals are milked, one treatment area 36e, wherein animals are treated, and one resting area 36f, wherein animals are allowed to rest. Alternatively, the two latter operating areas 36e-f serve different purposes, such as e.g. a further feeding area, a further milking area, or any other area, e.g. a monitoring area, an insemination area, or similar.

Figure 4:
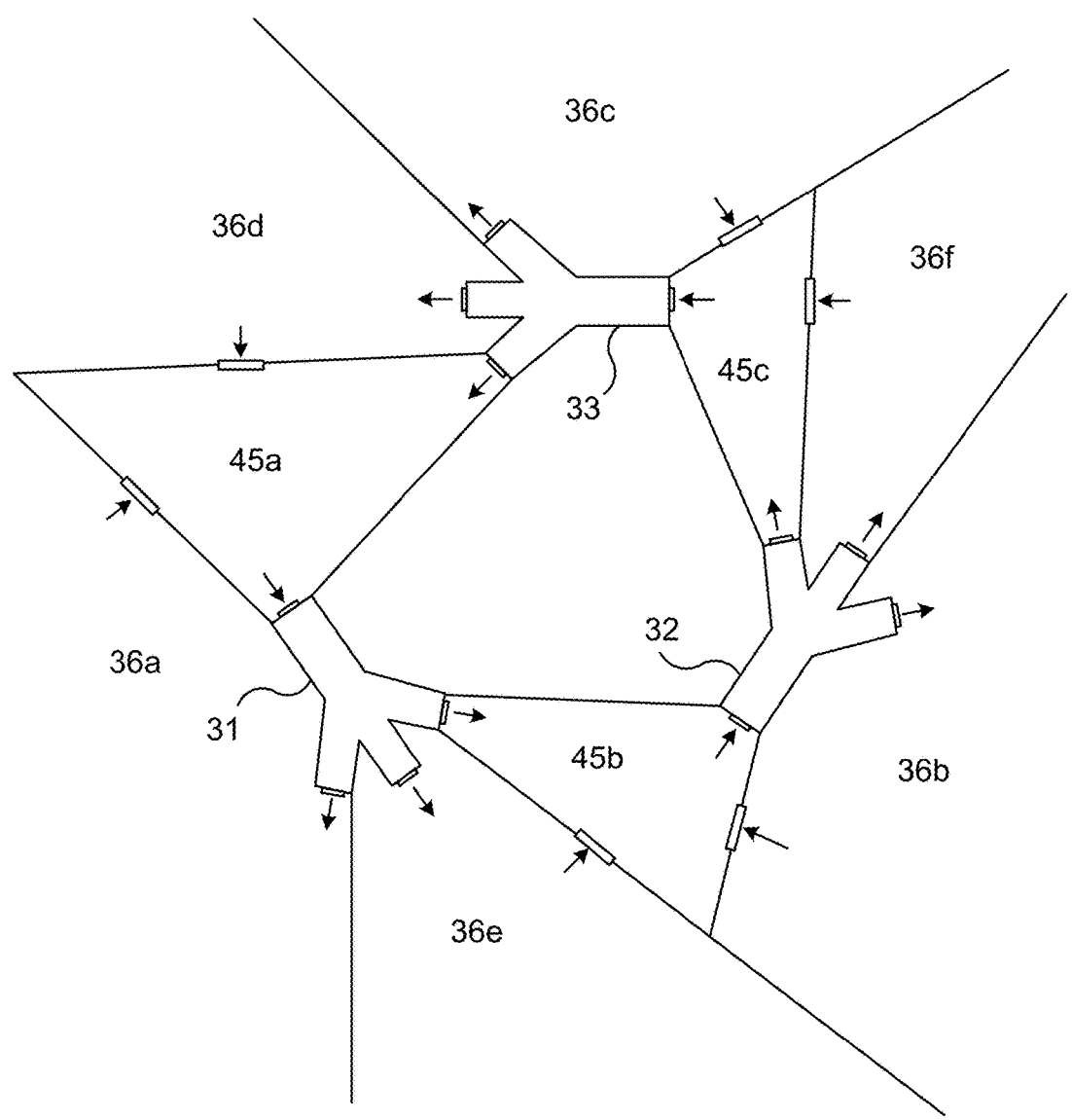

FIG. 4 illustrates a control arrangement similar to the control arrangement of FIG. 3 but with transit areas 45a-c having funnel shaped entrance portions to the smart gate arrangements 31, 32, 33.

This embodiment is of particular interest since animals in the control arrangement are in each transit area 45a-c guided towards the entrance of the next smart gate arrangement 31, 32, 33. A central area is left unused by the control arrangement, wherein the animals move in a manner, which resembles the manner in which vehicles move in a traffic roundabout.

Figure 5:
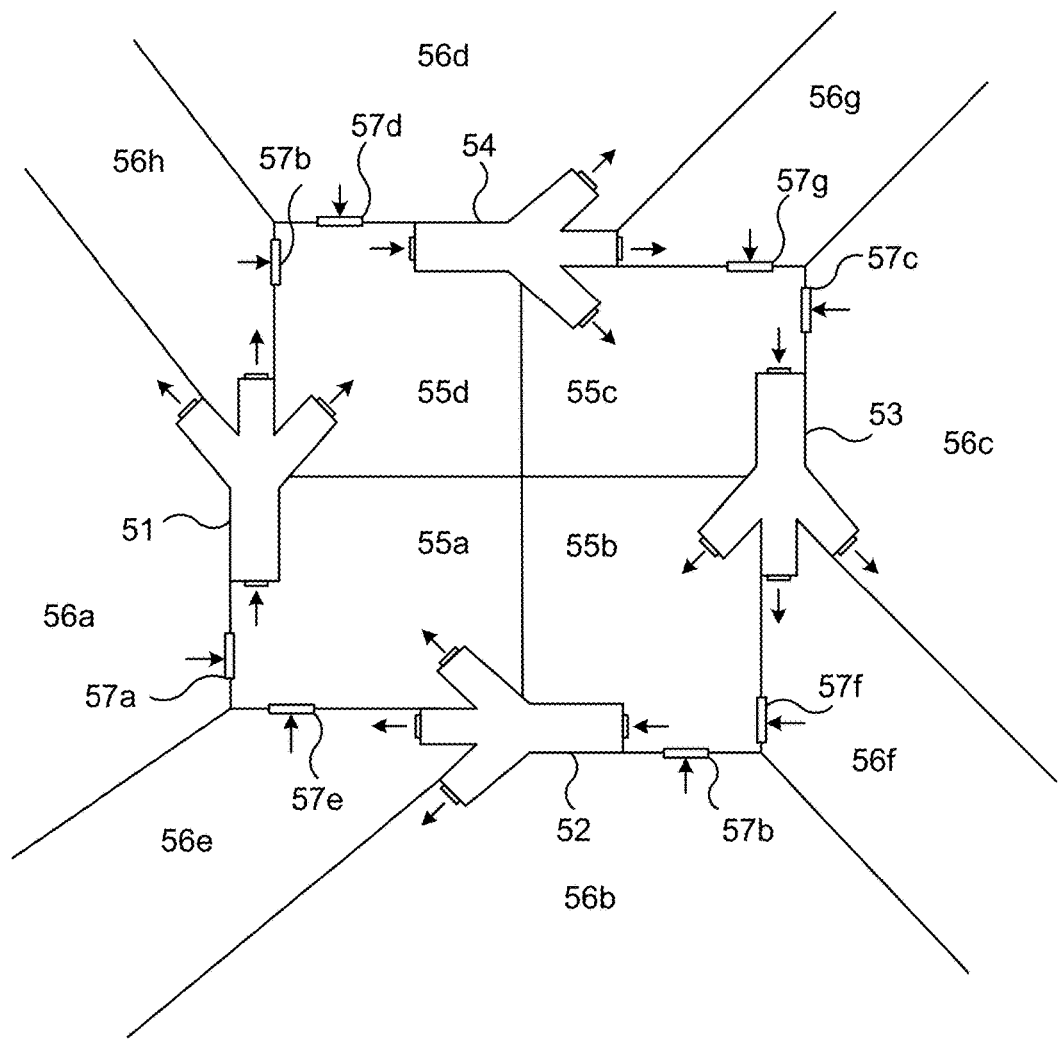

FIG. 5 illustrates a control arrangement similar to the control arrangement of FIG. 3 but with four smart gate arrangements, four transit areas, and eight one-way gates for entrance to the transit areas. Such control arrangement can selectively direct animals to eight different operating areas.

The control arrangement comprises four smart gate arrangements 51-54, each smart gate arrangement 51-54 including an entrance, through which animals can enter the smart gate arrangement 51-54, an animal identifier for identifying each animal having entered or is to enter the smart gate arrangement 51-54, and three separate exits, through which each animal, which has entered the smart gate arrangement 51-54, can be selectively guided to exit the smart gate arrangement 51-54 after having been identified.

Further, the control arrangement comprises four enclosed transit areas 55a-d, wherein each transit area 55d, 55c, 55b, 55a interconnects a first one of the exits of one of the smart gate arrangements 51, 54, 53, 52 with the entrance of a neighboring one of the smart gate arrangements 54, 53, 52, 51 in such a manner that an animal can be guided through the four smart gate arrangements 51-54 via the transit areas 55a-d in a circulating manner. Each of the four transit areas 55a-d comprises two one-way gates 57a-h for entrance to the transit area.

Finally, the control arrangement is connected to eight enclosed operating areas 56a-h, such that animals in each of the operating areas 56a-h can enter the control arrangement through a respective one of the eight one-way gates 57a-h on a voluntary basis and are capable of being guided automatically through the control arrangement to exit from the control arrangement and enter each of the operating areas 56a-h through a respective one of the second and third exits of the smart gate arrangements 51-54.

It can be seen from FIG. 5 that animals from half of the operating areas 56a-d, which enter a transit area 55a-d, can be guided back to the operating area 56a-d, from which it came, by means of being guided through only one of the smart gate arrangements 51-54.

Preferably, each of the transit areas 55a-d is large enough to house a plurality of the animals at a time, and may be funnel shaped at least in a portion closest to the entrance of the smart gate arrangement, which is connected thereto.

The operating areas 56a-h may comprise at least three feeding areas, particularly pasture areas, wherein animals are fed, and at least one milking area, wherein animals are milked.

Each of the smart gate arrangements disclosed above may be commercially available from DeLaval voluntary milking system 2013 as a smart selection gate combined with a three-way separation gate.

This description refers also to a method for guiding an animal from a first one to a second one of a plurality of enclosed operating areas by means of any of the control arrangements disclosed above. The animal is allowed to enter the control arrangement on a voluntary basis. In one smart gate arrangement, or, if required, in each of a plurality of the smart gate arrangements, which are connected to one another via a respective transit area, (i) the animal is identified, (ii) the second operating area is identified based on the identity of the animal, and (iii) the animal is selectively guided to exit the smart gate arrangement through the second exit thereof, if the second exit is connected to the second operating area, through the third exit thereof, if the third exit is connected to the second operating area, and through the first exit thereof, if neither of the second and third exits is connected to the second operating area.

It shall be appreciated that in an alternative embodiment of the control arrangement, one of the smart gate arrangements 31, 32, 33 of FIG. 3 or FIG. 4 may have only two exits. For instance, if the smart gate arrangement 31 would have only two exits 31c and 31e, the one-way gate 37f can be dispensed with and only five operating areas 36a-e can be connected to the control arrangement, but this may be acceptable in some situations.

Similarly, in yet an alternative embodiment of the control arrangement, two of the smart gate arrangements 31, 32, 33 of FIG. 3 or FIG. 4 may have only two exits. For instance, if the smart gate arrangement 31 would have only two exits 31c and 31e and the smart gate arrangement 33 would have only two exits 31c and 31e, the one-way gates 37f and 37e can be dispensed with and only four operating areas 36a-d can be connected to the control arrangement, but this may be acceptable in some situations.

To generalize the above, an embodiment of the control arrangement comprises (i) a first smart gate arrangements including an entrance through which animals can enter the smart gate arrangement, an animal identifier for identifying each animal having entered or is to enter the smart gate arrangement, and three separate exits, through which each animal, which has entered the smart gate arrangement, can be selectively guided to exit the smart gate arrangement after having been identified; (ii) a second smart gate arrangements including an entrance through which animals can enter the smart gate arrangement, an animal identifier for identifying each animal having entered or is to enter the smart gate arrangement, and two separate exits, through which each animal, which has entered the smart gate arrangement, can be selectively guided to exit the smart gate arrangement after having been identified; and (iii) at least a third smart gate arrangements including an entrance through which animals can enter the smart gate arrangement, an animal identifier for identifying each animal having entered or is to enter the smart gate arrangement, and two or three separate exits, through which each animal, which has entered the smart gate arrangement, can be selectively guided to exit the smart gate arrangement after having been identified.

A number of enclosed transit areas are provided, which corresponds to the number of the smart gate arrangements, wherein each transit area interconnects a first one of the exits of one of the smart gate arrangements with the entrance of a neighboring one of the smart gate arrangements in such a manner that an animal can be guided through the smart gate arrangements via the transit areas in a circulating manner.

The control arrangement is connectable to a number of enclosed operating areas corresponding to the twice the number of the transit areas minus the number of smart gate arrangements having only two exits, and the transit areas comprise one-way gates for entrance from each of the operating areas to the transit area, such that animals in each of the operating areas can enter the control arrangement through a respective one of the one-way gates and are capable of being guided through the control arrangement to exit from the control arrangement and enter each of the operating areas through a respective one of the second and optional third exits of the smart gate arrangements.

The invention claimed is:

1. A control arrangement for controlling movement of animals, comprising:
    at least two smart gate arrangements (11, 12; 31, 32, 33), each smart gate arrangement including an entrance (11a, 12a; 31a, 32a, 33a) through which animals can enter the smart gate arrangement, an animal identifier (11b, 12b; 31b, 32b, 33b) that identifies each animal that enters the smart gate arrangement, and three separate exits (11c-e, 12c-e; 31c-e, 32c-e, 33c-e), through which each animal that has entered the smart gate arrangement is selectively guided, each animal entering the smart gate arrangement being guided through the smart gate arrangement to exit the smart gate arrangement based on an identification of the animal by the animal identifier; and
    a plurality of enclosed transit areas (15a-b; 35a-c) corresponding to the number of the smart gate arrangements,
    a first transit area having provided therein a first one of the exits of a first one of the smart gate arrangements and an entrance of a neighboring second one of the smart gate arrangements with an unobstructed pathway therebetween, and
    a second transit area having provided therein a first one of the exits of the second one of the smart gate arrangements and an entrance of the first one of the smart gate arrangements with an unobstructed pathway therebetween,
    the plurality of enclosed transit areas being interconnected via the smart gate arrangements such that an animal can be guided through the at least two smart gate arrangements via the first and second transit areas in a circulating manner, and
    each of the transit areas (15a-b; 35a-c) further comprising a one-way gate for non-reversible entrance to the transit area from an enclosed operating area,
    the control arrangement being connectable to a plurality of enclosed operating areas (16a-d; 36a-f), such that animals in each of the enclosed operating areas can enter the control arrangement through a respective one of the one-way gates and exit from the control arrangement to enter any of the enclosed operating areas through a corresponding one of the second and third exits (11d-e, 12d-e; 31d-e, 32d-e, 33d-e) of the smart gate arrangements.

2. The control arrangement of claim 1, wherein the control arrangement is connectable to the enclosed operating areas such that animals that enter one of the transit areas from a one of the enclosed operating areas are guidable back to the one of the enclosed operating area from which they came via a single one of the smart gate arrangements.

3. The control arrangement of claim 1, wherein each of the transit areas is large enough to house a plurality of the animals at a time.

4. The control arrangement of claim 3, wherein each of the transit areas is large enough to house at least ten of the animals at a time.

5. The control arrangement of claim 1, wherein the transit areas (25a-b; 45a-c) are each funnel shaped in a portion closest to the entrance of the smart gate arrangement contained therein.

6. The control arrangement of claim 1, wherein the number of the smart gate arrangements (11, 12) is two, the number of the transit areas (15a-b) is two, and the number of the one-way gates (17a-d) is four.

7. The control arrangement of claim 6, wherein the number of operating areas is four, comprising three feeding areas and one milking area.

8. The control arrangement of claim 7, wherein the control arrangement is arranged with each one of two of the three feeding areas such that animals exiting from the one of two of the three feeding areas to enter one of the transit areas are guided back to the one of two of the three feeding areas from which they came via a single one of the smart gate arrangements.

9. The control arrangement of claim 7, wherein the feeding areas are pasture areas.

10. The control arrangement of claim 1, wherein the number of the smart gate arrangements (31, 32, 33) is three, the number of the transit areas (35a-c) is three, and the number of the one-way gates (37a-f) is six.

11. The control arrangement of claim 10, wherein the operating areas is six, comprising at least three feeding areas and at least one milking area.

12. The control arrangement of claim 11, wherein the control arrangement is arranged with each one of three of the at least three feeding areas such that animals exiting from the one of three of the at least three feeding areas to enter one of the transit areas are guided back to the one of three of the at least three feeding areas from which they came via a single one of the smart gate arrangements.

13. The control arrangement of claim 1, wherein the number of the smart gate arrangements (51-54) is four, the number of the transit areas (55a-d) is four, and the number of the one way gates (57a-h) is eight.

14. The control arrangement of claim 1, wherein the smart gate arrangements are each a computer controlled arrangement, whereby each animal is automatically guided to exit the smart gate arrangement through a selected one of the three separate exits depending on the identification of the animal by way the animal identifier of the smart gate arrangement.

15. The control arrangement of claim 1, wherein each of the transit areas is between 15 and 40 square meters.

16. The control arrangement of claim 1, wherein each of the transit areas are sized and configured to house a plurality of animals such that in traversing in a direction from one of the smart gate arrangements in the transit area to the other of the smart gate arrangements in the transit area, slower-moving animals may be passed by faster-moving animals.

17. An animal farm, comprising the control arrangement of claim 1 and operation areas (16a-d; 36a-f) connected to the control arrangement.

18. The animal farm of claim 17, wherein the operation areas comprise three feeding areas and one milking area.

19. A method for guiding an animal by means of a control arrangement, comprising:
  permitting an animal to enter an entrance of a first one of at least two smart gate arrangements (11, 12; 31, 32, 33), each of the at least two smart gate arrangement including an animal identifier and three separate exits (11c-e, 12c-e; 31c-e, 32c-e, 33c-e) through which each animal that has entered the smart gate arrangement is selectively guided,
  a first one (11c, 12c; 31c, 32c, 33c) of the exits of the at least two smart gate arrangements each opening into a respective enclosed transit area within which is provided an entrance of a neighboring second one of the smart gate arrangements with an unobstructed pathway therebetween,
  each transit area being connected to another transit area via the at least two smart gate arrangements, and each transit area having a one-way gate for entrance to the transit area from an enclosed operating area,
  the remaining two exits of each smart gate arrangement each leading to a respective enclosed operating area, and
  the entrance of the first smart gate arrangement located within a first of the transit areas;
  establishing an identification of the entering animal by way of the animal identifier (11b, 12b; 31b, 32b, 32c) located in the first of the at least two smart gate arrangements;
  determining, from the identification, that the animal should return to an operating area from which the animal exited prior to entering the first of the at least two smart gate arrangements; and
  selectively guiding the animal, based on the identification of the animal established by the animal identifier, through the first of the at least two smart gate arrangements to exit via the first of the three exits of the first smart gate arrangement thereby to enter a second of the enclosed transit areas (15a-b; 35a-d), and causing the neighboring one of the smart gate arrangements having an entrance in the second enclosed transit area, to guide the animal, upon entry of the neighboring one of the smart gate arrangements through to the operating area from which the animal exited prior to entering the first of the at least two smart gate arrangements, such that the animal traverses both the first and second transit areas successively in a circulating manner.

20. A control arrangement for controlling movement of animals comprising:
  at least two computer-controlled smart gate arrangements (11, 12; 31, 32, 33),
  each smart gate arrangement including an entrance (11a, 12a; 31a, 32a, 33a) through which animals can enter the smart gate arrangement, an animal identifier (11b, 12b; 31b, 32b, 33b) that identifies each animal that enters the smart gate arrangement, and three separate exits (11c-e, 12c-e; 31c-e, 32c-e, 33c-e), through which each animal that has entered the smart gate arrangement is selectively guided, each animal entering the smart gate arrangement being guided through the smart gate arrangement to exit the smart gate arrangement based on an identification of the animal by the animal identifier,
  each smart gate arrangement being computer-controlled to selectively guide each animal, based on an identification of the animal via the animal identifier, through one of the three separate exits; and
  a plurality of enclosed transit areas (15a-b; 35a-c) corresponding to the number of the smart gate arrangements, each transit area having located therein a first one of the exits of one of the smart gate arrangements and an entrance of an other one of the smart gate arrangements, arranged such that an animal entering one of the enclosed transit areas through an exit of a corresponding one of the smart gate arrangements transits through the transit area along an unobstructed path to an exit of the transit area via the entrance of a corresponding other one of the smart gate arrangements,
  the plurality of enclosed transit areas being interconnected via the smart gate arrangements such that an animal can be guided, via computer-controlled selection of the first one of the three exits of each of the smart gate arrangements, through each of the transit areas successively in a circulating manner, and each of the transit areas (15a-b; 35a-c) further comprising a one-way gate for non-reversible entrance to the transit area from a corresponding enclosed operating area, the transit areas and smart gate arrangements arranged such that animals in each of the enclosed operating areas can enter one of the transit areas of the control arrangement through a respective one of the one-way gates and be automatically guided to exit the control arrangement to enter any of the enclosed operating areas through a corresponding second or third one of the exits (11d-e, 12d-e; 31d-e, 32d-e, 33d-e) of the smart gate arrangements.

21. A control arrangement for controlling the movement of animals, comprising:

at least two computer-controlled smart gate arrangements (11, 12; 31, 32, 33), each smart gate arrangement including an animal identifier and three separate exits (11c-e, 12c e; 31c-e, 32c-e, 33c-e), through which each animal entering an entrance to the smart gate arrangement is automatically guided based on an identification of the animal by the animal identifier;

an arrangement of enclosed transit areas, each transit area comprising therein an entrance formed by a first of the three exits of a first smart gate arrangement, and an exit in the form of an entrance of a second smart gate arrangement, the remaining two exits of each smart gate arrangement opening into a respective enclosed operating area, each transit area further comprising a one-way gate for entrance to the transit area from an enclosed operating area, wherein the smart gate arrangements are controlled such that an animal entering a first transit area from one of the enclosed operating areas and identified by one of the animal identifiers to be returned to the one of the enclosed operating areas, is guided, by way of the computer-controlled smart gate arrangements, to successively traverse all of the transit areas in a circulatory manner by way of corresponding exits of the smart gate arrangements before returning to the one of the enclosed operating areas.

* * * * *